United States Patent [19]

Wilhelms

[11] Patent Number: 5,131,671
[45] Date of Patent: Jul. 21, 1992

[54] MAN'S BICYCLE WITH INTEGRATED AIR PUMP

[76] Inventor: Rolf E. Wilhelms, Preysingstrasse 11, 8000 Munich 80, Fed. Rep. of Germany

[21] Appl. No.: 648,979

[22] Filed: Jan. 31, 1991

[30] Foreign Application Priority Data

Jan. 31, 1990 [DE] Fed. Rep. of Germany ....... 4002827

[51] Int. Cl.⁵ ............................................. B62J 11/02
[52] U.S. Cl. ................................... 280/201; 280/288.3
[58] Field of Search ................. 280/201, 288.3, 288.4; 152/415, 416

[56] References Cited

U.S. PATENT DOCUMENTS

| | | | |
|---|---|---|---|
| 664,936 | 1/1901 | Fermoyle et al. | 280/201 |
| 671,030 | 4/1901 | Railton et al. | 280/201 |

FOREIGN PATENT DOCUMENTS

| | | | |
|---|---|---|---|
| 0917891 | 8/1954 | Fed. Rep. of Germany | 280/201 |
| 3602279 | 7/1987 | Fed. Rep. of Germany . | |
| 0593604 | 8/1925 | France | 280/201 |
| 0466546 | 11/1951 | Italy | 280/201 |
| 320179 | 3/1957 | Switzerland . | |
| 0018276 | of 1892 | United Kingdom | 280/201 |
| 0016333 | of 1894 | United Kingdom | 280/201 |
| 0003097 | of 1896 | United Kingdom | 280/201 |

Primary Examiner—Charles A. Marmor
Assistant Examiner—Anne Boehler
Attorney, Agent, or Firm—Sixbey, Friedman, Leedom & Ferguson

[57] ABSTRACT

A bicycle wherein at least one portion of the tubular frame is constructed as an air pump portion (1) with an air outlet (4) in the front part of the air pump portion, and in which there is an air piston (5) on an air piston rod (6) which ends in a pump handle (7) disposed outside the air pump portion (1).

13 Claims, 1 Drawing Sheet

MAN'S BICYCLE WITH INTEGRATED AIR PUMP

BACKGROUND OF THE INVENTION

The invention relates to a man's bicycle having a frame in which a top tube extends horizontally between a seat tube and head tube.

Such a man's bicycle is known from DE 36 02 279 A1. This man's bicycle with an integrated air pump has a longitudinal slot in the upper tube of the frame which reduces its stability and which corresponds substantially to the length of the pump piston rod. The total area of the horizontally disposed frame tube which has to be functionally adapted to the integrated pump is at least equal to twice the pump travel. The handle encloses the frame tube and is provided with, projecting into the tube frame through the longitudinal slot, a stud on which the pump piston rod is fixed.

A disadvantage of this integrated air pump construction is the fact that the corresponding man's bicycle has to be substantially redesigned during manufacture while at the same time the stability of the upper frame tube is diminished; finally, the question of how a repair can be carried out in the event of a fault in the pump handle, the piston rod, the pump piston and/or the stud connection between air pump handle and piston rod is not resolved.

In addition, it must be expected that the pump movement of the special air pump handle part will in the long run damage the part of the tubular bicycle frame on which it bears.

Finally, it requires a special connection between pump piston rod and handle part which is not usually found on bicycle pumps.

A further bicycle with an integrated air pump is described in Swiss Patent 320179. In this case, the air pump is disposed in the saddle bar and has the basic disadvantage that in order to use it the saddle must be pivoted in some way; accordingly, the pivotability of the saddle is the object of the Swiss publication, the solution being obviously quite complicated from the point of view of design.

SUMMARY OF THE INVENTION

The object of the invention is to provide a man's bicycle of the type mentioned at the outset but in which manufacture of the bicycle requires only negligible changes to the per se usual method of manufacturing bicycles and at the same time where per se known air pump components such as air piston, air piston rod and pump handle can be used; at the same time, the design should be simple and functionally safe.

Where the bicycle according to the invention is concerned, an air pump zone is constructed in the horizontally disposed upper frame tube.

As in the case of a per se known bicycle air pump, the relevant part of the frame tube consists of a closed hollow tube with an outlet valve on which is disposed a pushed-on or screwed-on hose, the length of which corresponds at least to the distance between the air outlet and the bicycle wheel valve. In this respect, the preferred distance is that between the air outlet and the valve of the wheel which is farthest removed from the air outlet, when the valve of this wheel is brought as close as possible to the outlet valve by rotation of the wheel.

In the tubular part of the air pump there is a rigid or deformable air piston in an embodiment such as is known in the case of air pumps for bicycles.

This air piston is disposed at the tip of the air piston rod which has the pump handle at its end. The air piston rod is guided by a for instance push-on or screw-on seal at the end of the tubular pump body.

Examples of embodiments of the invention are explained in greater detail hereinafter with reference to the attached FIGS. 1 to 3b, in which:

DETAILED DESCRIPTION OF THE PREFERRED EMBODIMENT

Figure 1:
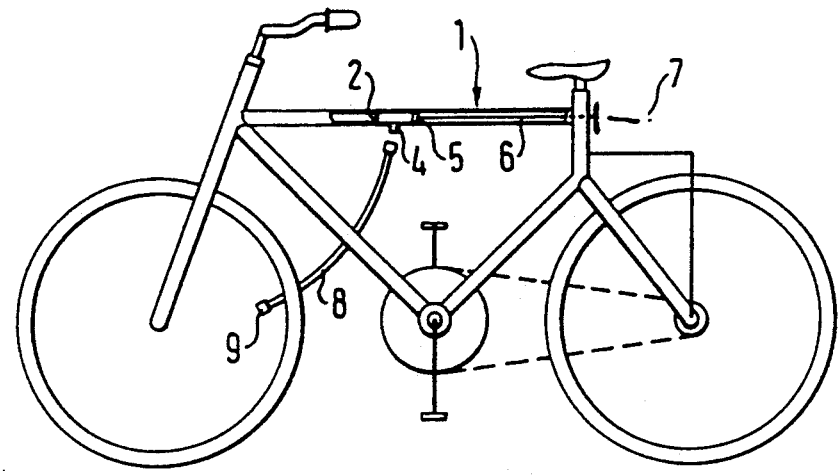
FIG. 1 is a diagrammatic side view of a bicycle according to the invention.

The bicycle according to the invention which is shown in FIG. 1 has the air pump region 1 disposed in the rear portion of the horizontal tube of the bicycle frame.

This frame tube is sealed in the front portion by a wall or a plug 2, the air outlet 4 being disposed in the immediate vicinity, within the air pump portion 1. In the saddle portion, this tube is provided with a closure cap 3 which can be fitted or screwed onto the end of the tube and which makes it possible to withdraw the air piston 5 with the air piston rod 6 for cleaning or repair.

In the air pump portion 1 is the air pump piston 5 disposed at the tip of the air piston rod 6 which is guided for movement centrally through the closure cap 3 and out of the air pump portion 1 and which terminates in a pump handle 7.

In the region of the wall or the plug 2 which closes off the front of the air pump portion 1, there is the air outlet 4 on which it is possible to screw or fit a hose 8 which has at its free end 9 a coupling piece for fitment on a tyre valve.

Figure 2A:
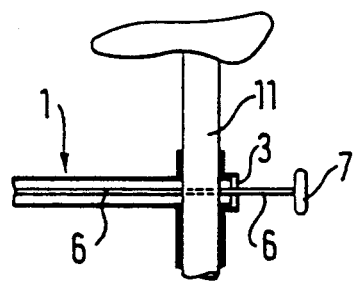
FIGS. 2a and 2b show a first embodiment of saddle zone on a bicycle according to the invention, in accordance with FIG. 1.
Figure 2B:
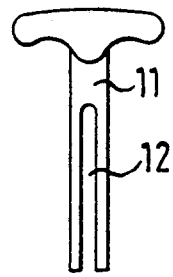

In the case of the conventional men's bicycles according to FIG. 1, it is necessary to guarantee passage of the saddle bar 11 through the air pump portion 1 of the upper frame tube (FIG. 2a). This can be accomplished in that the tubular saddle bar 11 according to FIG. 2b comprises a longitudinal slot 12 through which the air piston rod 6 can pass freely in the normal position of the saddle, the air piston rod 6 likewise passing through the closure cap 3.

Figure 3A:
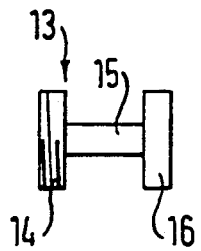
FIGS. 3a and 3b show a second embodiment of saddle zone on a bicycle according to the invention, in accordance with FIG. 1.

In a preferred embodiment, for mounting a securing the air piston rod 6 in the saddle portion, it is possible to provide a component 13 (FIG. 3a) which is screwed or fitted from behind and into the rear portion of the air pump portion 1 of the frame tube.

In this case, there is provided in the air pump portion 1, in front of the passage through which the saddle bar 11 passes, an internal screwthread for example which corresponds to the external screwthread on the annular head part 14 of the component 13; the middle part 15 of the component 13 is a tube part connected in one piece to the head part 14 and which is intended to accommodate the air piston rod 6 which passes through it; the integral adjacent end part 16 is likewise of annular construction and likewise has a centrally disposed aperture for passage of the air piston rod 6. Furthermore, there are preferably on the end part 16 of the component 13 means to accommodate a tool for screwing or locking the head part 14 into the end portion of the air pump portion 1. The outside diameter of the tubular middle part 15 of the component 13 is substantially equal to or less than the width of the longitudinal slot 12 in the saddle bar 11.

Figure 3B:
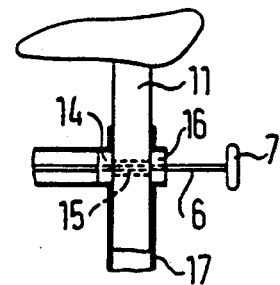

In FIG. 3b, the saddle portion of the bicycle according to the invention is shown diagrammatically with the component 13 screwed or fitted into it. Because this is a side view, the longitudinal slot 12 in the saddle bar 11, which is traversed by the middle part 15 of the component 13, is not shown. For the rest, the reference numerals correspond to the parts already described. Where this embodiment is concerned, the usual clip-like fixing of the saddle bar 11 in the vertically extending end 17 of the frame tube can be rotated through 90° and thus disposed or constructed sideways of the saddle and/or in a short extension of the frame tube end 17 above the top edge of the air pump portion 1.

I claim:

1. A man's bicycle in which a horizontally disposed upper frame tube of a bicycle frame is constructed as an air pump portion in which an air piston is guided on an air piston rod, an end of the air piston rod being connected to a pump handle, and a front part of the air pump portion disposed in front of the air piston being sealed in an air-tight manner except for the provision of an air outlet; wherein the air piston rod extends outside of the air pump portion through an aperture in a wall which seals a rear end portion of the air pump portion at a forward side of a seat tube of the frame, said seat tube receiving a saddle bar having a longitudinal slot to allow free passage of the air piston rod therethrough rearwardly of said wall; and wherein the pump handle is provided at an end of the air piston rod which has passed through the seat tube of the frame.

2. A man's bicycle according to claim 1, wherein a component is fitted into a rear portion of the air pump portion, the component comprising a head part and an end part which are of annular construction and are integral with a tube part that extends therebetween, the component having a centrally disposed aperture for passage of the air piston rod, the tube part having a diameter which is equal to or less than the width of the longitudinal slot in the saddle bar and a length sufficient to span the seat tube.

3. A man's bicycle according to claim 2, wherein the air outlet is detachably connected to a connecting hose, a free end of the connecting hose being constructed to connect to inlet valves of bicycle inner tubes to be pump-inflated.

4. A mam's bicyle according to claim 3, wherein said connecting hose has a push-on fitting for push-on engagement upon the air outlet.

5. A man's bicycle according to claim 2, wherein the air-tight sealing of the front part of the air pump portion is created by a plug which is fixed within the upper frame tube in close proximity to the air outlet.

6. A man's bicycle according to claim 2, wherein the air-tight sealing of the front part of the air pump portion is craeated by a wall which is fixed within the upper frame tube in close proximity to the air outlet.

7. A man's bicycle according to claim 1, wherein the air outlet is detachably connected to a connecting hose, a free end of the connecting hose being constructed to connect to inlet valves of bicycle inner tubes to be pump-inflated.

8. A man's bicycle according to claim 7, wherein said connecting hose has a push-on fitting for push-on engagement upon the air outlet.

9. A man's bicycle according to claim 1, wherein the air-tight sealing of the front part of the air pump portion is created by a plug which is fixed within the upper frame tube in close proximity to the air outlet.

10. A man's bicycle according to claim 9, wherein the air outlet is detachably connected to a connecting hose, a free end of the connecting hose being constructed to connect to inlet valves of bicycle inner tubes to be pump-inflated.

11. A man's bicycle according to claim 1, wherein the air-tight sealing of the front part of the air pump portion is created by a wall which is fixed within the upper frame tube in close proximity to the air outlet.

12. A man's bicycle according to claim 11, wherein the air outlet is detachably connected to a connecting hose, a free end of the connecting hose being constructed to connect to inlet valves of bicycle inner tubes to be pump-inflated.

13. A man's bicycle in which a horizontally disposed upper frame tube of a bicycle frame is constructed as an air pump portion in which an air piston is guided on an air piston rod, an end of the air piston rod being connected to a pump handle; wherein a front part of the air pump portion disposed in front of the air pistion is sealed in an air-tight manner except for the provision of an air outlet; wherein a rear end of said upper frame tube terminates at a forward side of a seat tube of the frame, said seat tube having a sealing cap at a rear side thereof; wherein a saddle bar having a longitudidinal slot therethrough is received in said seat tube; wherein said piston rod passes outwardly from said pump portion at the rear end of said upper frame tube, across said seat tube through the longitudinal slot in the saddle bar, and through said sealing cap so as to dispose the end of the piston rod that is connected to the pump handle exteriorly of said frame at a rear side of said sealing cap.

* * * * *